United States Patent [19]

Cherukuri et al.

[11] Patent Number: 4,983,405

[45] Date of Patent: Jan. 8, 1991

[54] REDUCED AND LOW-CALORIE SUGAR AND SUGARLESS CHEWING GUM COMPOSITIONS CONTAINING FIBER

[75] Inventors: Subraman R. Cherukuri, Towaco; Steven M. Faust, Stanhope, both of N.J.; Gul Mansukhani, Staten Island, N.Y.

[73] Assignee: Warner-Lambert Company, Morris Plains, N.J.

[21] Appl. No.: 288,749

[22] Filed: Dec. 22, 1988

Related U.S. Application Data

[63] Continuation-in-part of Ser. No. 9,173, Jan. 30, 1987, abandoned.

[51] Int. Cl.$^5$ ............................................. A23G 3/30
[52] U.S. Cl. ............................................. 426/3; 426/4; 426/804; 426/548
[58] Field of Search ................................. 426/3-6, 426/804, 548

[56] References Cited

U.S. PATENT DOCUMENTS

| | | | |
|---|---|---|---|
| 1,416,242 | 5/1922 | Steinemann | 426/3 |
| 1,977,059 | 10/1934 | Hatherell | 426/4 |
| 4,241,090 | 12/1980 | Stroz et al. | 426/4 |
| 4,248,894 | 2/1981 | Mackay | 426/3 |
| 4,252,830 | 2/1981 | Kehoe et al. | 426/3 |
| 4,357,354 | 11/1982 | Kehol et al. | 426/5 |
| 4,382,963 | 5/1983 | Klase et al. | 426/3 |
| 4,500,547 | 2/1985 | Puglia et al. | 426/5 |

OTHER PUBLICATIONS

Kent, N. L., Technology of Cereals, Pergamon Press, N.Y., 1978, pp. 293-296.

Primary Examiner—Jeanette Hunter
Attorney, Agent, or Firm—Daniel A. Scola, Jr.

[57] ABSTRACT

Reduced and low-calorie chewing gum compositions containing a gum base level of about 40 to about 80% by weight, and an oil-containing cereal bran, such as corn bran, in amounts of about 4 to about 20% by weight. These compositions result in a chewing product having a caloric content of about 0.1 to about 2.1 calories/gram.

15 Claims, No Drawings

REDUCED AND LOW-CALORIE SUGAR AND SUGARLESS CHEWING GUM COMPOSITIONS CONTAINING FIBER

This is a continuation of copending application Ser. No. 009,173, filed on Jan. 30, 1987, now abandoned.

This invention relates to reduced and low-calorie chewing gum compositions and more particularly to chewing gum base compositions incorporating an oil-containing cereal fiber and a high level of gum base in amounts sufficient to achieve a reduction in caloric content of the total composition.

To reduce calories in chewing gum it is often necessary to replace the soluble sugar and/or sugar alcohol bulking agents with low calorie alternatives. The soluble sugar and sugar alcohol bulking agents not only impart necessary sweetness but also a discontinuity to the gum base which results in a softer more pleasant chew and mouth feel.

Most reduced or low-calorie chewing gum compositions generally contain about 25% by weight of a water insoluble gum base, inert fillers or texturizing agents in amount of at least 40% by weight up to 90% or more, a water soluble flavoring agent and water soluble sweeteners such as sucrose and corn syrup or in sugarless gum sorbitol, mannitol and artificial sweeteners. Also incorporated within the gum base may be plasticizers or softeners to improve consistency and texture of the gum.

The gum base of reduced or low-calorie chewing gum generally contains a natural rubber gum base, a synthetic rubber gum and/or mixtures thereof. When synthetic gum bases are utilized, the preferred elastomer component has been the styrene-butadiene copolymer (SBR). Gum base is noncaloric and insoluble. A chewing gum composition high in gum base content may also thus be reduced in calories.

Previous attempts to produce such high gum base content low calorie chewing gum compositions have resulted in products with a hard, tight, rubber chew and poor texture.

U.S. Pat. No. 4,382,963, Klose, et al. disclose a sugar-free, low calorie chewing gum utilizing spray-dried polydextrose as the bulking agent. From 65% to 85% by weight polydextrose is incorporated into gum base to form a sugar-free, unsweetened, chewing gum with a caloric density of less than one calorie per gram.

In published U.K. patent application No. 2,159,384A a no-calorie, noncariogenic chewing gum composition is disclosed. The chewing gum composition comprises 92% to 99% by weight of a gum base, up to 4% of glycerol and up to 3% of flavorings and was found to be substantially non-adhesive to the teeth, particularly to dental prostheses. The gum base comprises an elastomer, hydrogenated or partially hydrogenated animal or vegetable oil, mineral filler, polyvinyl acetate, fatty acid glycerides, resins, natural gum and wax in specified amounts.

In U.S. Pat. Nos. 4,252,830 and 4,357,354 Kehoe, et al. disclose a substantially calorie-free chewable chewing gum base which includes gum base containing high levels of inert fillers, such as calcium carbonate or talc in amounts of about 50% to about 85% and about 40% to about 95% by weight respectively. The chewable gum base includes at least 10% air voids entrapped in the gum base matrix which, upon chewing, becomes filled with moisture causing asserted increase in bolus volume.

In U.S. Pat. No. 4,241,091, Stroz, et al., disclose a substantially calorie-free, non-cariogenic, non-adhesive chewing gum consisting essentially of gum base, a substantially calorie-free sweetener, from 1 to 15% by weight alpha-cellulose and from 1 to about 40% by weight water. The chewing gum of Stroz, et al., has a high bolus volume.

In U.S. Pat. No. 4,241,090, also to Stroz, discloses a chewing gum composition comprising a gum base, a flavor, from 1 to 15% alpha-cellulose, 1–30% water, and 0.2–3% thickener in the form of a hydrolyzed (enzymatically or chemically purified) cereal solid, various water soluble gums, malto dextrin, modified food starch and low D.E. corn syrup solids. The cereal solids are presumably purified to remove fats, proteins and carbohydrates to lower their caloric value prior to incorporation into the gum.

U.S. Pat. No. 1,977,059 discloses the addition of wood, asbestos, cotton and silk fibers to chewing gum base. Additionally disclosed are the incorporation of natural gums.

While fibrous material has been added to chewing gum compositions for a number of reasons, it has long been recognized that fiber is generally not compatible with chewing gum and would result in the aforementioned shortcomings in the final product. It has been discovered quite unexpectedly, however, that certain fibers, such as cereal brans can be added without deleterious effects.

This is believed to be in part to the oil and moisture inherent in certain fibers which plasticizes the gum base, thereby enhancing the fiber/gum base compatibility. The result is a smooth, non-fibrous mouthfeel and a softness in chew which heretofore was not present in fiber-containing chewing gums. This softer chew allows for good flavor and sweetener release properties which are necessary to produce a commercially acceptable chewing gum composition. The oil-containing fiber appears to have the added benefit of rounding out the flavor to achieve a more mellow tone and taste.

Certain fibrous materials such as apple fiber, hops and barley have been incorporated into chewing gum compositions, but were unsuccessful in that the gums were initially difficult to chew and soon fell apart. Additionally, these compositions exhibited poor flavor and sweetener release properties.

Gum base can exhibit any number of properties and characteristics which in turn affect the final properties of the chewing gum composition as a whole. Among those properties are texture, chew, film-forming ability and sweetener and flavor release. These gum base properties are altered by the addition of fiber. chewing gum composition prepared therefrom would be expected to exhibit unacceptable texture, hard initial chew followed by sloppy subsequent chew and poor flavor and sweetener release.

The addition of fiber to conventional gum base and chewing gum compositions has not been successful. Chewing gums prepared in this manner exhibited the expected results of the cud breaking apart when chewed, delayed flavor release due to retention by the fiber, gritty mouthfeel, off flavor notes and unacceptably hard initial chew. Levels of 20 and 25% fiber were tested in conventional compositions containing 25 to 30% gum base, with the result that the chewing gums prepared therefrom fell apart during chew. Chewing gum prepared with cellulose, for example, was found to be too dry and gritty to introduce it in the quantities necessary to reduce substantially the caloric content of the chewing gum.

Thus, as with other inert filler-type materials, fiber has not been successfully introduced in conventional chewing gum compositions for the purpose of lowering the caloric content of the gum.

It would therefore be desirable to develop a reduced calorie chewing gum that offers a reduction in caloric content using a relatively high level of gum base in combination with an oil-containing cereal fiber which does not suffer from fibrous mouthfeel, discontinuity during mastication or other unacceptable characteristics such as hard chew or poor texture and taste.

In accordance with the present invention, a chewing gum composition is prepared having a caloric content of about 0.1 to about 2.1 calories/gram comprising:

(a) a gum base present in amounts of about 45 to about 80% by weight;

(b) a sweetener present in amounts sufficient to impart sweeteners;

(c) a flavor; and (d) about 4% to about 20% by weight of an oil-containing cereal fiber.

Those cereal fibers which have a fat (oil) content of about 1 to about 4% are useful. It is critical that the oil content be sufficient to compatabilize, through plasticization, the base with the fiber. Generally, beyond this range, the oil content provides too many calories for use in reduce calorie compositions. These fibers usually have a moisture content of about 1 to 6%. Among those falling within these requirements are corn bran and corn germ, wheat bran and wheat germ, soy bran, oat bran, rice bran and mixtures thereof.

In one preferred embodiment, the oil-containing cereal fiber is corn bran and the gum base is present in amounts of about 40% to about 60% by weight of the total chewing gum composition.

It would be expected that the addition of high levels of dry, fibrous material would be incompatible with the chewing gum composition, resulting in discontinuity of the bolus during mastication and unacceptable organoleptic properties. It has been discovered, however, that these oil-containing fibrous materials exhibit compatibility with the gum base and other ingredients and can actually enhance such characteristics as chew, texture and flavor, while providing the benefit of a reduction in calories in the gum product.

Those fibers which have been found to exhibit these properties most profoundly are oil-containing, unpurified fibers, such as corn bran. By the term "unpurified" is meant the fiber has not been hydrolyzed or chemically or enzymatically treated. For example, hydrolyzed cereals have been added to chewing gum as described in U.S. Pat. No. 4,241,090 to Stroz et al., discussed above. Hydrolysis of cereals is accomplished by acid or enzyme treatment of the cereal to remove fats, oils, proteins and carbohydrates and leave a residue of non-digestible, dietary fiber behind. As previously discussed materials free of oil are generally not compatible with chewing gum compositions.

Without wishing to be bound by any one theory, it is believed that the oil naturally present in the fiber aids in plasticizing and softening the gum base. Rather than producing a harder, gritty chew which falls apart during mastication, the oil-containing fiber smooths the texture of the gum, softens the bite and rounds-out the flavor. Thus, the benefits of low and reduced calories are achieved while enhancing other important attributes necessary for a commercially acceptable chewing gum.

An additional benefit attributed to the fiber is due to its moisture absorption capabilities. During mastication, the fiber aids in capturing moisture and saliva, thereby contributing to the release of water-solubles such as sweetener into the mouth. Simultaneously, an increase in cud volume due to fiber swelling produces additional juiciness and enhanced mouthfeel. This swelling during mastication has an important economic advantage as well, because a smaller piece size can be sold without sacrificing the actual bolus volume and cud size perceived by the user.

It has also been discovered that the use of high levels of gum base is critical to the goal of reducing calories because it facilitates the incorporation of higher levels of fiber. The combination, therefore, of high levels of base and oil-containing fiber is required to produce a chewing gum composition which maximizes the advantages discussed herein.

The gum base may be chosen from a wide variety of conventional ingredients, but must be capable of being added to a chewing gum composition in higher than conventional amounts, i.e. greater than 15 to 30% by weight without resulting in a hard, tight and rubbery chew. Generally those gum bases which will be most suitable for the instant invention are those containing high levels of polyvinyl acetate (PVA) in addition to elastomers. In a preferred embodiment of the invention a gum base is prepared using a gum base comprising:

(a) about 0.5 to about 20% elastomer;

(b) about 10% to about 25% of a polyvinyl acetate having a medium molecular weight of about 35,000 to 55,000;

(c) about 4.5% to about 10.0% acetylated monoglyceride;

(d) about 6% to about 10% of a wax having a melting point below about 60° C.; and (e) remaining amounts of a material selected from the group consisting of elastomer solvent, emulsifiers, plasticizers, fillers and mixtures thereof.

The elastomers useful in the gum base of the inventive compositions include styrene butadiene rubber (SBR) and those non-styrene butadiene rubber (non-SBR) elastomers normally included in gum base. Illustrative elastomers include SBR, synthetic gums or elastomers such as polyisobutylene and isobutylene-isoprene copolymers; natural gums or elastomers such as chicle, natural rubber, jelutong, balata, guttapercha, lechi, guayule, caspi, sorva or mixtures thereof. Among these, polyisobutylene, polyethylene, polyvinylacetate, isobutylene-isoprene copolymers or mixtures thereof along or with SBR are preferred.

As previously mentioned, it is preferred that the gum base contain a high percentage of PVA in addition to the above-mentioned elastomers. The preferred PVA material is of the medium molecular weight variety having a mean average molecular weight of about 35,000 to about 55,000 and is most preferably present in amounts of about 12 to about 17% by weight of the gum base. A blend of low molecular weight PVA and medium molecular weight PVA may be employed with excellent results. Normally low molecular weight PVA has a mean molecular weight of about 12,000 to about 10,000. The low and medium molecular weight PVA components are particularly useful in a molar ratio which yields excellent elasticity and avoids tightness of chew in the final product.

As an optional component, it is possible to employ small amounts of high molecular weight PVA in combination with the medium molecular weight component. The high molecular weight PVA may be used in amounts of 0 to 5% by weight of the base and has a mean average molecular weight of 65,000 to 95,000.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin, pentaerythritol ester of wood rosin, glycerol ester of wood rosin, glycerol ester of partially dimerized rosin, glycerol ester of polymerized rosin, glycerol ester of tall oil rosin, glycerol ester of wood rosin and partially hydrogenated wood rosin and partially hydrogenated methyl ester of rosin, such as polymers of alpha-pinene or beta-pinene; terpene resins including polyterpene and mixtures thereof. The solvent may be employed in an amount ranging from about 10% to about 75% and preferably about 45% to about 70% by weight to the gum base.

A variety of traditional ingredients such as plasticizers of softeners such as lanolin, stearic acid, sodium stearate, potassium stearate, glyceryl triacetate, glycerine and the like for example, natural waxes, petroleum waxes, such as polyurethane waxes, paraffin waxes and microcrystalline waxes may also be incorporated into the gum base to obtain a variety of desirable textures and consistency properties. These individual additional materials are generally employed in amounts of up to about 30% by weight and preferably in amounts of from about 3% to about 20% by weight of the final gum base composition.

The chewing gum composition may additionally include the conventional additives of flavoring agents, coloring agents such as titanium dioxide; emulsifiers such as lecithin and glyceryl monostearate; and additional fillers such as aluminum hydroxide, alumina, aluminum silicates, calcium carbonate, and talc and combinations thereof. These fillers may also be used in the gum base in various amounts. Preferably the amount of fillers when used will vary from abut 4% to about 30% by weight of the final chewing gum.

The present invention contemplates the inclusion of those sweeteners well known in the art, including both natural and artificial sweeteners. Thus, sweeteners may be chosen from the following non-limiting list: sugars such as sucrose, glucose (corn syrup), dextrose, invert sugar, fructose, and mixtures thereof; saccharine and its various salts such as the sodium or calcium salt; cyclamic acid and its various salts such as the sodium salt; amino acid-based and dipeptide sweeteners such as aspartame; dihydrochalcone compounds; talin; glycyrrhizin; Stevia Rebaudiana (Stevioside); and sugar alcohols such as sorbitol, sorbitol syrup, mannitol, xylitol, and the like. Also contemplated as an additional sweetener is the nonfermentable sugar substitute (hydrogenated starch hydrolysate) which is described in U.S. Reissue Pat. No. 26,959. Also contemplated is the synthetic sweetener 3,6-dihydro-6-methyl-1-1,2,3-oxathiazin-4-one-2,2-dioxide particularly the potassium (Acesulfame-K), sodium and calcium salts thereof as described in German Patent No. 2,001,017.7.

In general, the amount of sweetener will vary with the desired amount of sweeteners selected for a particular chewing gum. This amount will normally be 0.001% to about 60% by weight when using an easily extractable sweetener. The water-soluble sweeteners described in category A above, are preferably used in amounts of about 25% to about 60% by weight. In contrast, the artificial sweetener described in categories B and C are used in amounts of about 0.005% to about 5.0% and most preferably about 0.05% to about 2.5% by weight of the final gum composition. These amounts are ordinarily necessary to achieve a desired level of sweetness independent from the flavor level achieved from flavor oils.

Flavoring agents well known to the chewing gum art may be added to the chewing gum compositions of the instant invention. Suitable flavorings include both natural and artificial flavors, and mints such as peppermint, menthol, artificial vanilla, cinnamon, various fruit flavors, both individual and mixed, and the like are contemplated. The flavorings are generally utilized in amounts that will vary depending upon the individual flavor, and may, for example, range in amounts of about 0.5% to about 3% by weight of the final chewing gum composition weight.

The colorants useful in the present invention include the pigments such as titanium dioxide, that may be incorporated in amounts of up to about 1% by weight, and preferably up to about 6% by weight. Also, the colorants may include other dyes suitable for food, drug and cosmetic applications, and known as F.D. & C. dyes and the like. The materials acceptable for the foregoing spectrum of use are preferably water-soluble. Illustrative examples include indigoid dye, known as F.D. & C. Blue No. 2, which is the disodium salt of 5,5'-indigotindisulfonic acid. Similarly, the dye known as F.D. & C. Green No. 1, comprises a triphenylmethane dye and is the monosodium salts of 4-[4-Nethyl-p-sulfobenzylamino)diphenylmethylene]-[1-(N-ethyl-N-p-sulfoniumbenzyl)-2,5-cyclohexadienimine]. A full recitation of all F.D. & C. and D. & C. and their corresponding chemical structures may be found in the Kirk-Othmer Encyclopedia of Chemical Technology, in Volume 5, at Pages 857–884, which text is accordingly incorporated herein by reference.

The chewing gum formulations are prepared by conventional methods. An illustrative process involves first melting the gum base at a temperature from about 70° C. to about 120° C. and mixing the gum base in a kettle with a liquid softener and/or a emulsifier for 2 to 8 minutes. To this mixture ⅓ to ⅔ of the sweetener ingredient and colors are added and mixing is continued for 1 to 4 minutes. To this mixture the remaining sweetener ingredients are added along with the fiber and while mixing is continued, the flavoring agent is slowly added. Mixing is maintained for 1 to 4 minutes. To this mixture a humectant can be added and mixing is continued for 1 to 4 minutes. The gum is discharged from the kettle and formed into its desired shape such as strips, slabs, chunks, ball ropes and/or center filled.

The chewing gum composition of this invention may additionally include the conventional additives of coloring agents such as titanium dioxide; emulsifiers such as lecithin and glyceryl monostearate; and fillers such as dicalcium phosphate, aluminum hydroxide, alumina, aluminum silicates, talc, calcium carbonate, and combinations thereof. The total amount of fillers present is generally up to about 10% by weight. The inventive compositions can be used to prepare sugar or sugarless chewing gums and may be substantially anhydrous as well.

The following examples are given to illustrate the invention, but are not deemed to be limiting thereof. All percentages given throughout the specification are based upon weight of the total chewing gum composition unless otherwise indicated.

EXAMPLES

Chewing gum compositions were prepared using conventional gum-making methods in accordance with the formulation listed in the tables below. Those compositions having a pre-fix "I" fall within the instant invention. Those compositions having a pre-fix "P" are prior art compositions. Expert chew panels were conducted to evaluate chew, flavor and sweetness attributes as well as to determine the overall organoleptic qualities inherent in the compositions. Panelists were asked to rate these attributes over a 10 minute period at 30 second, 2 minute, 6 minute and 10 minute intervals. The results, shown below, indicate the inventive composition I-2 are well rated higher and are clearly preferred hedonically over prior art composition P-I.

| Hedonic Scale | | | | | | | | | | |
|---|---|---|---|---|---|---|---|---|---|---|
| 0 | 10 | 20 | 30 | 40 | 50 | 60 | 70 | 80 | 90 | 100 |
| Very Poor | | | | | | | | | | Excellent |

| | | Average Rating | |
|---|---|---|---|
| Interval | Attribute | P-I | I-2 |
| 30 Sec.: | Chew | 47 | 62 |
| | Flavor | 27 | 50 |
| | Sweetness | 20 | 47 |
| 2 min.: | Chew | 50 | 72 |
| | Flavor | 50 | 58 |
| | Sweetness | 47 | 52 |
| 6 min.: | Chew | 52 | 72 |
| | Flavor | 34 | 50 |
| | Sweetness | 23 | 40 |
| 10 min.: | Chew | 52 | 72 |
| | Flavor | 23 | 40 |
| | Sweetness | 13 | 35 |

Inventive formulations I-1 through I-4 are similar in formulation except for the variation in type of filler. Each of these compositions exhibited excellent chew with excellent sweetener an flavor release. The corn bran rounded-out the sharpness of the flavor, making the flavor perception more mellow and pleasing.

Inventive formulations I-5 through I-8 varied the base content and fiber (corn bran) content to achieve various calorie contents. These compositions produced excellent chew and texture properties. The higher base content permitted higher usage of fiber (corn bran) and therefore a higher reduction in calories. The release properties of the chewing gum where enhanced at higher levels of base. The higher addition of fiber to the base gave a larger cud due to swelling during mastication and created a juicier chew and extended flavor and sweetener release.

I-9 and I-10 are similar to I-1 and I-2 except mannitol is substituted for sorbitol as the bulk sweetener. These compositions produced gums which were excellent tasting but slightly dryer than sorbitol-containing gums and the initial sweetness was slightly less.

I-11 demonstrates that a high level (20%) of fiber can be incorporated into the inventive compositions to make low calorie chewing gums with organoleptic properties which are equivalent or better than conventional, non-fiber containing chewing gums.

All the inventive compositions produced chewing gums which swelled when chewed, exhibited a soft chew which maintained its continuity during chew, mellowed the flavor tones and exhibited significantly increased juiciness and flavor and sweetener release.

The prior art compositions P-1 and P-4 contained cellulose as a fiber additive. These gums were hard and rubbery and failed to exhibit juiciness and flavor release. These compositions additionally did not swell or alter the flavor characteristics, were dry and gritty and tended to break apart during chew.

P-2 and P-3 show the use of apple bran and malt bran fibers. These compositions were gritty, failed to swell and fell apart during mastication.

P-5 and P-6 show typical commercial chewing gum compositions and their calorie content for comparison to the calorie content of the inventive compositions.

The invention being thus described, it will be obvious that the same may be varied in many ways. Such variations are not to be regarded as a departure from the spirit and scope of the invention and all such modifications are intended to be included within the scope of the claims.

TABLE I

| | % by weight | | | | | | | |
|---|---|---|---|---|---|---|---|---|
| Ingredient | I-1 | I-2 | I-3 | I-4 | I-5 | I-6 | I-7 | I-8 |
| Gum base | 60 | 60 | 60 | 60 | 80.6 | 70 | 50 | 45 |
| Mannitol | — | — | 3 | — | — | — | — | — |
| Sorbitol | 20 | 23 | 23 | 26 | — | 17 | 35 | 42 |
| Corn bran | 9 | 9 | 9 | 9 | 17.16 | 11 | 7 | 5 |
| Softener | 2.85 | 2.85 | 2.85 | 2.85 | .09 | .09 | 2.85 | 2.85 |
| Filler | 6 | 3 | — | — | — | — | 3 | 3 |
| Sweetener | 0.35 | 0.35 | 0.35 | 0.35 | 0.35 | 0.35 | 0.35 | .35 |
| Flavor | 1.8 | 1.8 | 1.8 | 1.8 | 1.8 | 1.8 | 1.8 | 1.8 |
| Calories/gram | 1.1 | 1.25 | 1.3 | 1.4 | 0.14 | 0.75 | 1.7 | 1.97 |

TABLE II

| | % by weight | | |
|---|---|---|---|
| Ingredient | I-9 | I-10 | I-11 |
| Gum base | 60 | 60 | 65 |
| Mannitol | 20 | 23 | — |
| Sorbitol | — | — | 7 |
| Polydextrose | — | — | — |
| Corn bran | 9 | 9 | 20 |
| Softener | 2.85 | 2.85 | 2.85 |
| Filler | 6 | 3 | 3 |
| Sweetener | 0.35 | 0.35 | 0.35 |
| Flavor | 1.8 | 1.8 | 1.8 |
| Calories/gram | 0.71 | 0.77 | 0.64 |

TABLE III

| | % by weight | | | |
|---|---|---|---|---|
| Ingredient | P-1 | P-2 | P-3 | P-4 |
| Gum base | 60 | 60 | 60 | 60 |
| Mannitol | 20 | — | — | — |
| Sorbitol | — | 23 | 23 | 23 |
| Polydextrose | 9 | — | — | — |
| Corn bran | — | — | — | — |
| Softener | 2.85 | 2.85 | 2.85 | 2.85 |
| Filler | — | 3 | 3 | 3 |
| Sweetener | 0.35 | 0.35 | 0.35 | 0.35 |
| Flavor | 1.8 | 1.8 | 1.8 | 1.8 |
| Cellulose | — | — | — | 9 |
| Apple bran | — | 9 | — | — |
| Malt bran | — | — | 9 | — |
| Calories/gram | 0.69 | 1.44 | 1.32 | 1.18 |

TABLE IV

| Ingredient | % by weight P-5 | P-6 |
|---|---|---|
| Gum base | 23 | 21 |
| Softener | 15 | 0.45 |
| Sugar | — | 54 |
| Sorbitol | 50.6 | — |
| Mannitol | 6.3 | — |
| Corn syrup | — | 16 |
| Emulsifier | 2.9 | 0.2 |
| Filler | — | 6 |
| Flavor | 2.0 | 1.35 |
| Sweetener | 0.2 | — |
| Calories/gram | 3.0 | 3.1 |

We claim:

1. A chewing gum composition having a reduced calorie content comprising:
   (a) a gum base present in an amount of from about 45 to about 80% by weight, said gum base containing about 6% to about 10% of a wax having a melting point below 60° C. and from about 10% to about 25% by weight of a polyvinyl acetate having a medium molecular weight of about 35,000 to 55,000;
   (b) a sweetener present in amounts sufficient to effectuate sweetness;
   (c) a flavor; and
   (d) about 4% to about 20% by weight of an oil-containing unpurified cereal fiber compatible with the base, wherein the oil content of said fiber is about 1% to about 4% by weight of the fiber; and wherein the calorie content of the chewing gum composition is about 0.1 to about 2.1 calories/gram.

2. The composition of claim 1 wherein the gum base is present in amounts of about 40 to about 60% by weight.

3. The composition of claim 1 wherein the gum base comprises an elastomer selected from the group consisting of synthetic gums, natural gums, synthetic elastomers, natural elastomers an combinations thereof.

4. The composition of claim 1 wherein the sweetener is selected from the group consisting of water-soluble natural sweeteners, water-soluble artificial sweeteners, dipeptide sweeteners, amino acid-based sweeteners and mixtures thereof.

5. The composition of claim 4 wherein the sweetener is selected from the group consisting of sucrose, fructose, glucose (corn syrup), dextrose, invert sugar; saccharine and its salts; cyclamic acid and its salts; aspartame; dihydrochalcone; glycyrrhizin; Stevia Rebaudiana (stevioside); sorbitol, mannitol, xylitol; hydrogenated starch hydrolysate, 3,6-dihydro-6-methyl-1-1,2,3-oxathiazin-4-one-2,2-dioxide (acesulfame-) and its salts; talin; and combinations thereof.

6. The composition of claim 1 wherein the flavor is selected from the group consisting of natural flavors, artificial flavors and mixtures thereof.

7. The composition of claim 6 wherein the flavor is selected from the group consisting of peppermint oil, spearmint oil, menthol, cinnamon oil, oil of wintergreen, fruit flavors and essences, kola flavor, kola extract and combinations thereof.

8. The composition of claim 1 wherein the oil-containing cereal fiber is selected from the group consisting of wheat bran, wheat germ, oat bran, soy bran, rice bran, corn bran, corn germ and mixtures thereof and is present in amounts of about 5 to about 15% by weight.

9. The composition of claim 6 wherein the corn bran is present in amounts of about 7 to about 9% by weight.

10. A reduced calorie chewing gum composition having excellent cohesive properties and which exhibits increased juiciness and swelling of the bolus during mastication in the absence of thickening agents, said composition comprising:
    (a) about 20 to about 75% by weight of gum base, said gum base containing from about 6% to about 10% of a wax having a melting point below 60° C. and from about 10% to about 25% of a polyvinyl acetate having a medium average molecular weight of about 35,000 to about 55,000;
    (b) a sweetener present in amounts sufficient to effect sweetness;
    (c) a flavor; and
    (d) about 4% to about 20% by weight of a cereal fiber containing sufficient oil to impart plasticization of the base and enhance compatibility of the fiber and the chewing gum composition, wherein the calorie content of the chewing gum composition is about 0.1 to about 1 calories/gram.

11. The composition of claim 10 wherein the fiber is corn bran.

12. The composition of claim 11 wherein the corn bran is present in amounts of about 5 to about 9% by weight.

13. The composition of claim 11 wherein the caloric content of a chewing gum product formed therefrom is about 0.1 to about 2.1 calories/gram.

14. A reduced calorie chewing gum composition comprising:
    (a) a gum base present in amounts of about 45 to about 80% by weight, said gum base containing from about 6% to 10% of a wax having a melting point below about 60° C. and to about 25% of a polyvinyl acetate having a medium molecular weight of from about 35,000 to about 55,000;
    (b) a sweetener;
    (c) a flavor; and
    (d) about 9% to about 20% by weight of an oil-containing unpurified cereal fiber distributed within the composition in sufficient amounts to provide plasticization effect as well as swelling of the bolus during mastication, said fiber having an oil content about 1% to about 4% by weight of the fiber and the total calorie content of the chewing gum composition is about 0.1 to about 2.1 calories/gram.

15. The composition of claim 14 wherein the cereal fiber is corn bran.

* * * * *